United States Patent Office 2,927,228
Patented Mar. 1, 1960

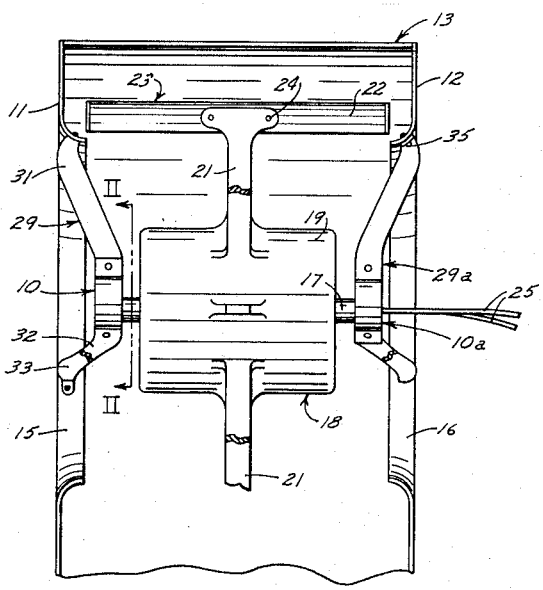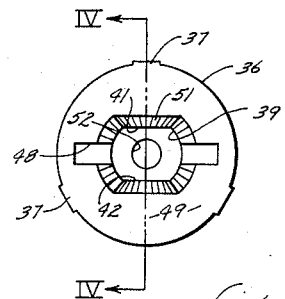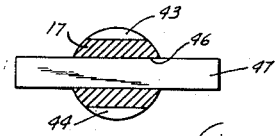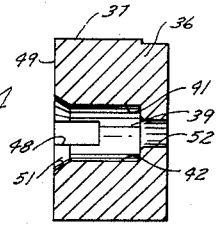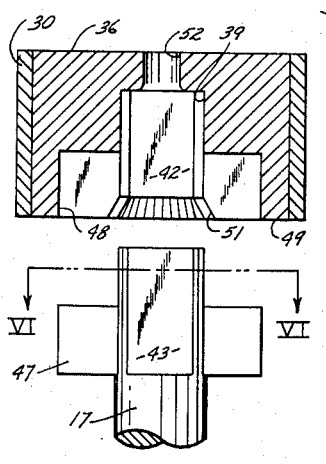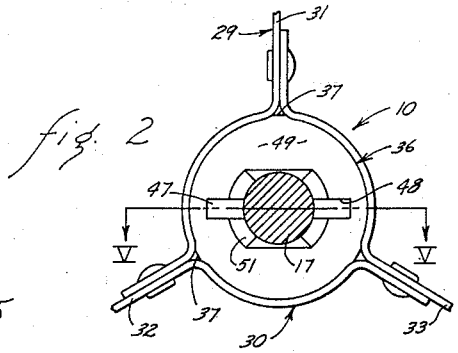
INVENTOR.
WILDEN A. ROCKAFIELD
BY
Woodhams Blanchard & Flynn
ATTORNEYS

2,927,228

SUPPORT STRUCTURE FOR A MOTOR HAVING A ROTATING FIELD

Wilden A. Rockafield, Kalamazoo, Mich., assignor to The Brundage Company, Kalamazoo, Mich., a corporation of Michigan Application August 5, 1957, Serial No. 676,241

1 Claim. (Cl. 310—91)

This invention relates in general to a support structure for the armature shaft of a motor having a rotating field upon which a centrifugal blower wheel is supported. More specifically, this invention relates to a torque resisting, shock and vibration isolating device for mounting said armature shaft within said support structure.

It is well known that motors of the type having a rotating field surrounding a stationary armature are often utilized for driving centrifugal blower wheels by mounting the blower blades upon the structure connected to the rotating field. In such case, the armature shaft is supported upon, and secured with respect to, the blower housing for resisting the motor torque. It is also well known that vibrations are developed by the motor and fan wheel of such a blower during normal operation thereof. Thus, where a substantially rigid connection is provided between the armature shaft and the blower housing, said vibrations are transmitted to the blower housing through the armature shaft and support structure. Such transmission of vibrations and torques is usually highly undesirable, due to the resultant objectionable noises or due to the resultant disturbance to satisfactory operation of other equipment which may be associated with the blower unit.

Accordingly, a primary object of this invention has been the provision of a structure for supporting, upon and within the housing of a centrifugal blower unit, a motor having a rotating field upon which the blower wheel is mounted, said support structure having a device for satisfactorily resisting the torque of the motor and yet effectively isolating from the blower housing the vibrations and other shocks developed in, and by, the motor and blower wheel.

A further object of this invention has been the provision of a motor and wheel support structure, as aforesaid, wherein said device includes a pair of sleeves for resiliently, but non-rotatably, mounting the armature shaft within said support structure, said sleeves being arranged for easy slidable engagement with the free ends of the armature shaft.

A further object of this invention has been the provision of an isolation or damping device, as aforesaid, which is extremely easy and very inexpensive both to fabricate and to assemble, which requires no maintenance, which has a wide range of effectiveness and which will have no adverse effect upon the performance of the motor or blower with which it is used.

Other objects and purposes of this invention will be apparent to persons familiar with this type of equipment upon reading the following specification and examining the accompanying drawings, in which:

Figure 1 is a broken sectional view of a centrifugal blower unit equipped with a shaft supporting structure embodying the invention.

Figure 2 is a sectional view taken along the line II—II of Figure 1.

Figure 3 is an end elevational view of an isolation sleeve with the armature shaft removed therefrom.

Figure 4 is a sectional view taken along the line IV—IV of Figure 3.

Figure 5 is an exploded sectional view taken along the line of V—V of Figure 2.

Figure 6 is a sectional view taken along the line VI—VI of Figure 5.

For the purpose of convenience in description, the terms "inner," "outer," and derivatives thereof, as used herein, will have reference to the geometric center of the blower wheel support structure or parts thereof, such as the isolation sleeve for the armature shaft.

*General description*

In order to carry out the above mentioned objects, a support structure has been provided for supporting upon a blower housing the armature of a motor having a rotating field upon which a blower wheel is mounted. Said support structure includes at least one bracket mountable, as desired, on a blower housing, said bracket including a torque resisting and vibration isolating sleeve engageable with one end of the armature shaft. Said armature shaft is equipped with means cooperable with said sleeve for preventing relative rotation therebetween.

*Detailed description*

As shown in Figure 1, the support structures 10 and 10a, to which this invention relates, are mounted, in this particular embodiment, upon the side sheets 11 and 12, respectively, of a double inlet blower housing 13, preferably within the inlet cones 15 and 16. The support structures 10 and 10a, which are preferably, but not necessarily, identical, engage the opposite ends of the armature shaft 17 of the motor 18 having a rotating field. Said rotating field is housed within a casing 19, which may be provided with radially extending blade supporting means 21 for engaging certain of the blades 22 of a conventional centrifugal blower wheel 23. Means, such as the rivets 24, may be used for securing the blades 22 to said blade supporting means 21. The motor 18 is connected by the conductors 25 to any convenient source, not shown, of electrical energy.

The support structures 10 and 10a being identical in this particular embodiment, a detailed description of the support structure 10 will be given and such will be understood to apply in substance to the support structure 10a. Parts of the support structure 10a will be identified, where necessary, by the same numerals used on corresponding parts in the support structure 10, except that the suffix "a" will be added thereto.

The support structure 10 (Figures 1 and 2) is comprised of a bracket 29 forming a central ring 30, from which extend the radially disposed support arms 31, 32 and 33. Said support arms are preferably spaced uniformly around said ring 30 and are secured near their outer ends upon the side sheet 11, for example, by means of the bolts or rivets 35. The said support arms are preferably three in number and are arranged with their minimum dimension aligned parallel with the axis of the shaft 17 in order to minimize their obstruction to the movement of air through the inlet opening provided by the cone 15.

The ring 30 (Figures 2 and 5) encircles and snugly embraces the vibration isolating sleeve 36, which is fabricated from a flexible resilient material, such as rubber. Said sleeve 36 has a plurality, here three, of parallel ridges 37, which are integral with, and extend radially from, the periphery of said sleeve and are preferably disposed at uniform intervals around the circumference thereof. Said ridges, if desired, may be receivable into corresponding grooves in the inner surface of the ring 30 to cooperate with the grooves for preventing relative rotational movement of the sleeve 36 and the ring 30, but preferably, and as here shown, the ridges are merely compressed more than the remainder of the sleeve when the sleeve is positioned within the ring 30.

The sleeve 36 has a coaxial shaft opening 39 which extends substantially through said sleeve and into which either end of the shaft 17 is receivable. As shown in Figure 3, the shaft opening 39 is out-of-round in that its radial wall has a pair of diametrically opposed, substantially parallel, flat portions 41 and 42. The corresponding end portions of the armature shaft 17 (Figure 6) are each provided with flat surfaces 43 and 44 for engaging the corresponding flat portions 41 and 42 in said shaft opening 39. Said shaft 17 is also provided with a slot 46 (Figure 6) disposed in each end thereof between, and substantially parallel with, the flat surfaces 43 and 44. A cross bar 47 is snugly disposed within the slot 46 and extends radially beyond the opposite sides of the shaft 17. The isolation sleeve 36 is provided with an elongated recess 48 in that axial end 49 thereof through which the shaft opening 39 enters. Said recess 48 is disposed between, and parallel with, the flat portions 41 and 42 in said shaft opening 39. Thus, said recess 48 intersects said shaft opening 39 and communicates therewith for slidably and snugly receiving the ends of the cross bar 47 when the adjacent end of the shaft 17 is received into the shaft opening 39.

The open end of the shaft opening 39 may be flared, as indicated at 51 in Figures 4 and 5, to facilitate entry of the shaft 17 into said openings 39. A bleed opening 52 communicates with the blind end of the shaft opening 39 to permit the movement of air with respect to the opening 39 during the connection and disconnection of the shaft 17 with the isolation sleeve 36.

The support structure 10a (Figure 1) includes a bracket 29a which may be, and for a double inlet blower preferably is, substantially identical with the bracket 29 of the support structure 10. Accordingly, a second isolation sleeve 36 may be disposed within the bracket 29a for engaging and supporting the adjacent end of the armature shaft 17 in exactly the same manner as discussed hereinabove with respect to the support structure 10.

For a single inlet blower, the second isolation sleeve 36 will usually be mounted by any convenient means directly upon the closed wall of the housing.

*Operation*

When the motor 18 is energized, the casing 19, hence the blower wheel 23 mounted thereon, will rotate about the armature shaft 17. Such starting of the motor 18 will impose a substantial and sudden torque upon the armature shaft 17 in a rotational direction opposite the rotation of the wheel 23. This torque will be transmitted to the isolation sleeves 36 in the support structures 10 and 10a. However, due to the resilient and flexible characteristics of said sleeves 36, said sleeves will yield and distort sufficiently to reduce the initial impact of such torque upon the brackets 29 and 29a. Thus, said isolation sleeves will also smooth out or dampen sudden fluctuations in such torque which, if not so dampened, are transmitted through the brackets 29 and 29a to the housing 13.

After the blower wheel 23 has reached its normal operating speed, the turbulence of the air being moved thereby and slight imperfections in the balance of the wheel or motor 18 may, and often do, create vibrations in the armature shaft 17. The isolation sleeves 36 materially reduce the adverse effects of these vibrations also.

Although a particular, preferred embodiment of the invention has been disclosed hereinabove for illustrative purposes, it will be understood that variations or modifications thereof which lie within the scope of the invention are fully contemplated unless specifically stated to the contrary in the appended claims.

I claim:

In a support structure for supporting upon and within a centrifugal blower housing the armature shaft of a motor having a rotating field upon which the blower impeller is mounted for rotation therewith, the combination comprising: a support bracket mountable upon the blower housing, said bracket consisting of three substantially identical elements, each element having an arcuate center portion near one end defining approximately one third of a cylinder, the two end portions of each element extending outwardly away from the periphery of said cylinder; means securing the short-end portion of each element to the long portion of one other element, whereby said arcuate center portions form a cylindrical center member open at both axial ends; a resilient, flexible and substantially cylindrical sleeve snugly disposed within said center member, said sleeve having a coaxial shaft opening and a diametrically disposed recess in one axial end thereof and intersecting said shaft opening, said recess being of lesser length than the inside diameter of said center member; a crossbar associated with one end of the armature shaft and extending transversely thereof and radially therefrom, said crossbar being snugly receivable into said recess when said end of said shaft is received into said shaft opening so that said crossbar is encircled by said sleeve; and means on said ring and said sleeve for resisting relative rotation therebetween.

References Cited in the file of this patent

UNITED STATES PATENTS 2,207,251    Guedon  _____ July 9, 1940
2,776,088    Wentling  _____ Jan. 1, 1957